United States Patent [19]

Zimmerman et al.

[11] Patent Number: 4,695,128

[45] Date of Patent: Sep. 22, 1987

[54] FIBER OPTIC CABLE

[75] Inventors: Bernd Zimmerman; John Chamberlain, both of Hickory, N.C.

[73] Assignee: Siecor Corporation, Hickory, N.C.

[21] Appl. No.: 843,984

[22] Filed: Mar. 25, 1986

[51] Int. Cl.[4] .............................. G02B 6/44
[52] U.S. Cl. ................................. 350/96.23
[58] Field of Search ....................... 350/96.23

[56] References Cited

U.S. PATENT DOCUMENTS

| 2,780,087 | 5/1883 | Brisben | 174/97 |
| 4,118,594 | 10/1978 | Arnaud | 350/96.23 |
| 4,199,224 | 4/1980 | Oestrich | 350/96.23 |

FOREIGN PATENT DOCUMENTS 0198405 10/1984 Japan ................. 350/96.23

OTHER PUBLICATIONS

"Stress-Strain Behavior of Optical Fiber Cables", Bark, et al, *Proceedings of the 28th International Wire and Cable Symposium*, pp. 385-390 (1979), The above article shows fiber behavior during construction, and elongation in a stranded cable on pp. 387 and 388.

"Recent Developments in Mini-Unit Cable", by Derek Lawrence, *Proceedings of the 32nd International Wire and Cable Symposium*, pp. 301-307 (1983), This article shows a bundle of optical fibers within a loose tube fiber optic cable.

*Primary Examiner*—Eugene R. LaRoche
*Assistant Examiner*—James C. Lee
*Attorney, Agent, or Firm*—Roy B. Moffitt; J. David Abernethy

[57] ABSTRACT

A fiber optic cable having an outer jacket, a central coaxial member and at least one buffer tube wound around the central coaxial member, the buffer tube holding at least one optical fiber, where the buffer tube is shaped to allow extensive movement of the fiber radial to the cable axis, but allows only slight movement of the fiber in other directions. The buffer tubes may be filled with a gel to cushion optical fibers within.

6 Claims, 2 Drawing Figures

FIBER OPTIC CABLE

BACKGROUND OF THE INVENTION

1. Field of the Invention

The invention is in the field of loose tube fiber optic cables.

2. Description of the Related Art

Fiber optic cables are becoming increasingly accepted in U.S. telecommunications due to their superior ability to transmit data as compared to copper cables. However, the glass fibers used in fiber optic cables are more sensitive to cable stresses; copper cables are more forgiving in this regard. As a result, loose tube fiber optic cables were developed; the optical fibers are placed in buffer tubes with room for the fibers to move within the buffer tubes. This construction decouples the glass fiber from forces applied to the cable within a given range of cable compression or elongation. Thus, the cable is able to maintain an acceptable level of performance during specified ranges of temperature and during cable bending and pulling within certain tolerances. The buffer tubes may be filled with a jelly to lubricate the fibers and retard moisture entry, further improving cable performance. The buffer tubes may contract or elongate without immediately affecting the fibers therein.

One way to construct such a loose tube fiber optic cable is to strand, or wind the buffer tubes containing fibers around a central strength member. Quite often, the central member is a circular cylinder. Also, the buffer tubes often have cylindrical shapes. When cylindrical buffer tubes are stranded around a cylindrical central member, the buffer tubes form a curve called a helix. The equation of the length L of the section of a helix over one period $(0 \rightarrow \theta \rightarrow 2\pi)$ may be expressed as $L^2 = \pi^2 D^2 + P^2$, where D is the diameter of the helix and P, herein called the pitch, is the distance between adjacent loops.

Since the buffer tubes assume the shape of a helix in this construction, optical fibers contained within the buffer tubes must also follow a helical path. It will be recalled that the inner diameter of the buffer tube is larger than the outer diameter of the optical fiber, allowing the fiber relative movement within the buffer tube. The objective of the loose tube is to allow the fiber not to undergo stress, due to transverse forces from the buffer tube or tension directly on the fiber, while the buffer tube experiences contraction or elongation. If the buffer tube contracts, due to cold temperatures, for example, then the buffer tube pitch and diameter tend to decrease. As the fiber tends to keep the same length, it would then attempt to increase its helix path diameter; that is, to migrate radially outward within the buffer tube until the inner surface of the buffer tube is reached. If the buffer tube elongates, due to tension on the cable, for example, the fiber tends to migrate inward within the buffer tube until the inner wall of the buffer tube nearest the cable center is reached to avoid tension. When these extreme points are reached, further contraction or elongation will rapidly increase bends in the glass fiber, resulting in increased attenuation and cable failure. This is due to the fact that the fiber no longer has room to move.

These considerations impact on cable design. Within a buffer tube of a given diameter, placing more optical fibers within a buffer tube may be more cost-effective, but the ability of the cable to withstand temperature and physical stress decreases. Similarly, ability to withstand these stresses increases as buffer tube size increases, but at the price of making the cable larger.

SUMMARY OF THE INVENTION

The present invention is for a fiber optic cable having an outer jacket, a central member about which a buffer tube is wound, and at least one optical fiber within the buffer tube, which has a narrow shape, e.g. rectangular or elliptical, to allow the fiber to move radially with respect to the cable center, but allows only slight movement in the transverse direction within the tube. This construction allows more buffer tubes to be placed within a cable of a given diameter, because they may be arranged like spokes around a central wheel, that is, the central member about which the buffer tubes are wound. A plurality of optical fibers may be placed within the buffer tubes. Buffer tubes may be attached to the central member in manufacturing. Space within a buffer tube not occupied by an optical fiber may be filled with a gel. Within any plane perpendicular to the central cable axis, fibers will be allowed maximum radial movement within the buffer tube, but only slight transverse movement with respect to lines radiating outward from the cable center. A plurality of optical fibers within a buffer tube may be stranded together to form a fiber bundle; in this case, the buffer tube will be slightly wider in the transverse direction than the maximum diameter of the fiber bundle. In either case, the space remaining in the transverse direction is just wide enough to allow for the extreme cold temperature specification without squeezing the fiber or fibers inside. "Wound", as used herein, includes S-Z stranding, or reversing the direction of lay at intervals.

It is an object of the invention to allow a greater density of optical fibers to be used within a loose-tube type fiber optic cable and to achieve greater cost and space efficiency while substantially retaining the advantages of loose tube fiber optic cable design.

DETAILED DESCRIPTION OF THE PREFERRED EMBODIMENT

Figure 1:
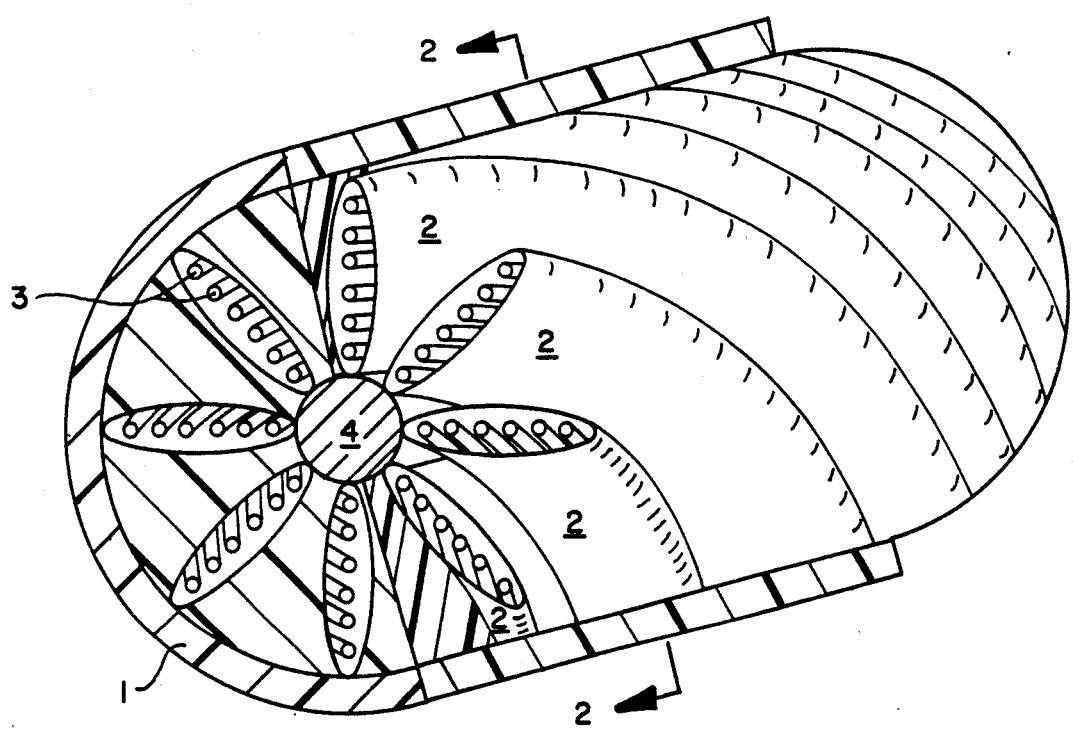
FIG. 1 is a perspective cutaway view of a cable of the present invention.

FIG. 1 shows a fiber optic cable having an outer jacket 1, buffer tubes 2, optical fibers (or bundles of optical fibers) 3, and central member 4.

Figure 2:
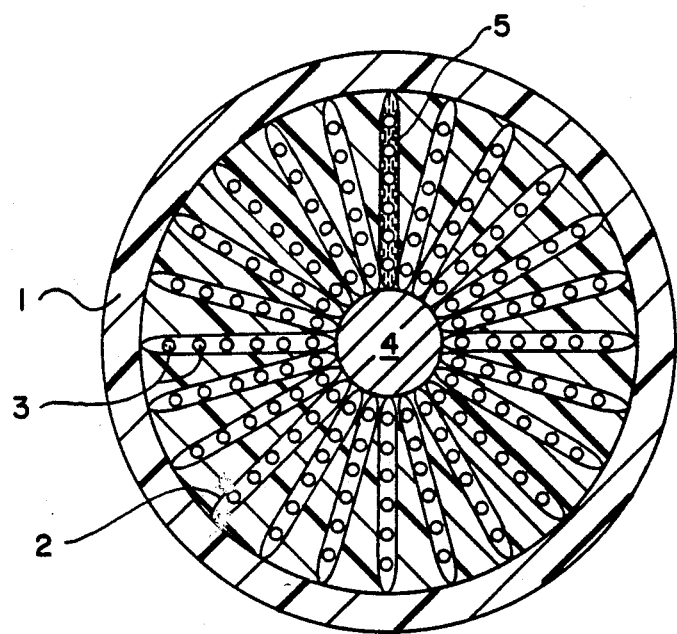
FIG. 2 is a sectional view of a cable of the present invention showing the portion of the cable within a plane perpendicular to the cable axis.

FIG. 2 shows the cable of FIG. 1 along the sectional line shown therein. Buffer tubes 2 are shown to extend radially outward from central member 4 to outer jacket 1. Optical fibers or bundles of optical fibers 3 are held substantially in lines radial to the cable axis within the plane shown. At any point along the length of the cable, a cross-section will show the same design as FIG. 2. Also shown in one tube of FIG. 2 is gel 5, which is inserted in the interspace within the buffer tube around the fibers (or fiber bundles) 3. It is contemplated that the best mode for making the invention would be to use gel around all optical fibers or optical fiber bundles.

A variety of materials may be used. The central member may be metallic or non-conductive, such as glass reinforced plastic. The buffer tubes may be a plastic.

The outer jacket may be polyurethane. A plastified polyurethane jelly may be used as a filling compound. Optical fibers may be obtained from Corning Glass Works.

The central member in each case is coaxially disposed within the outer jacket, which may have a tubular shape. The optical fibers or bundles of optical fibers are loosely held within the buffer tubes wherein, within any plane perpendicular to the central member, the fibers or fiber bundles are free to move within the buffer tubes along the line segment containing the fiber (or fiber bundles) radially extending from the central member to the outer jacket, but are restrained from moving more than slightly elsewhere within said plane. The buffer tube may be longer in its radial direction (radial to the cable axis) than in its transverse direction (perpendicular to its radial direction in the plane). The terms "radial direction" and "transverse direction" are used in this sense in the claims.

What is claimed is:

1. A fiber optic cable comprising:
   (a) an outer jacket;
   (b) a central member coaxially disposed within the outer jacket, delimiting a first space between the outer jacket and the central member;
   (c) a first optical fiber disposed within said first space; and
   (d) a buffer tube containing said first optical fiber wound around said central member within said first space, loosely holding said first optical fiber wherein, within any plane perpendicular to the central member, said first optical fiber is free to move within said buffer tube along the line segment containing said first optical fiber radially extending from said central member to said outer jacket, but said first optical fiber is restrained from moving more than slightly elsewhere within said plane.

2. A fiber optic cable as recited in claim 1, wherein the space within the buffer tube not occupied by the optical fiber is filled with a gel.

3. A fiber optic cable as recited in claim 1, further comprising a second optical fiber within said buffer tube.

4. A fiber optic cable as recited in claim 1 wherein said buffer tube is longer in its radial direction than in its transverse direction.

5. A fiber optic cable comprising:
   (a) an outer jacket;
   (b) a central member coaxially disposed within said outer jacket, delimiting a first space between said outer jacket and said central member;
   (c) a bundle of optical fibers disposed within said first space; and
   (d) a buffer tube containing said bundle of optical fibers wound around said central member within said first space, loosely holding said bundle of optical fibers wherein, within any plane perpendicular to said central member, said bundle of optical fibers is free to move within said buffer tube along the line segment containing said buffer tube extending from said central member to said outer jacket, but said bundle of optical fibers is restrained from moving more than slightly elsewhere within said plane.

6. A fiber optic cable as recited in claim 5, wherein the space within the buffer tube not occupied by the bundle of optical fibers is filled with a gel.

* * * * *